(12) United States Patent
Ko et al.

(10) Patent No.: US 12,449,337 B2
(45) Date of Patent: Oct. 21, 2025

(54) HIGH-TEMPERATURE-GAS COLLECTION APPARATUS AND METHOD

(71) Applicant: LG Chem, Ltd., Seoul (KR)

(72) Inventors: Eunbyeol Ko, Daejeon (KR); Young Hee Lim, Daejeon (KR); Ji Won Park, Daejeon (KR); Eunyeong Jin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 24 days.

(21) Appl. No.: 18/028,863

(22) PCT Filed: May 2, 2022

(86) PCT No.: PCT/KR2022/006223
§ 371 (c)(1),
(2) Date: Mar. 28, 2023

(87) PCT Pub. No.: WO2022/235027
PCT Pub. Date: Nov. 10, 2022

(65) Prior Publication Data
US 2024/0248017 A1    Jul. 25, 2024

(30) Foreign Application Priority Data

May 6, 2021   (KR) .................. 10-2021-0058559
Jun. 1, 2021  (KR) .................. 10-2021-0070790
Apr. 29, 2022 (KR) .................. 10-2022-0053755

(51) Int. Cl.
*G01N 35/04*    (2006.01)
*F27B 17/02*    (2006.01)
(Continued)

(52) U.S. Cl.
CPC ............... *G01N 1/44* (2013.01); *F27B 17/02* (2013.01); *G01N 1/2247* (2013.01)

(58) Field of Classification Search
CPC ...... G01N 1/44; G01N 1/2247; G01N 1/2214; G01N 1/22; G01N 1/4022; G01N 2001/4033; G01N 1/405; F27B 17/02
(Continued)

(56) References Cited

U.S. PATENT DOCUMENTS 3,739,067 A * 6/1973 Stahr ................. F27D 11/06
                                                        373/138
5,442,949 A   8/1995 Kinoshita et al.
(Continued)

FOREIGN PATENT DOCUMENTS

CN    103017524 A    4/2013
CN    202973887 U    6/2013
(Continued)

OTHER PUBLICATIONS

International Search Report for PCT/KR2022/006223 mailed Aug. 22, 2022. 3 pgs.
(Continued)

*Primary Examiner* — Robert R Raevis
(74) *Attorney, Agent, or Firm* — Lerner David LLP (57) ABSTRACT

The present invention relates to a high-temperature-gas collection apparatus and method, and the objective of the present invention is to provide a high-temperature-gas collection apparatus and method, which stably collect high-temperature gas generated from a sample in a high-temperature environment.

16 Claims, 7 Drawing Sheets

(51) Int. Cl.
*G01N 1/22* (2006.01)
*G01N 1/44* (2006.01)

(58) Field of Classification Search
USPC ........ 73/19.12, 863, 863.11, 863.12, 863.21,
73/863.31, 864.34, 864, 73, 864.73
See application file for complete search history.

(56) References Cited

U.S. PATENT DOCUMENTS

| | | | |
|---|---|---|---|
| 6,840,120 | B2 | 1/2005 | Sakairi et al. |
| 2003/0156282 | A1 | 8/2003 | Komatani et al. |
| 2004/0045497 | A1 | 3/2004 | Kriews et al. |
| 2014/0283626 | A1* | 9/2014 | McMurtry .......... H01J 49/0427 |
| | | | 219/522 |
| 2019/0371590 | A1 | 12/2019 | Wilkins et al. |

FOREIGN PATENT DOCUMENTS

| | | |
|---|---|---|
| CN | 104501599 A | 4/2015 |
| CN | 105571319 A | 5/2016 |
| CN | 205483696 U | 8/2016 |
| CN | 207268684 U | 4/2018 |
| EP | 1348123 A1 | 10/2003 |
| EP | 3240014 A1 | 11/2017 |
| JP | S51089794 A | 8/1976 |
| JP | H07016145 A | 1/1995 |
| JP | 2596882 B2 | 4/1997 |
| JP | H09218141 A | 8/1997 |
| JP | H10-104143 A | 4/1998 |
| JP | 2000-028579 A | 1/2000 |
| JP | 2000-221123 A | 8/2000 |
| JP | 2000241404 A | 9/2000 |
| JP | 2001-159592 A | 6/2001 |
| JP | 2003-114224 A | 4/2003 |
| JP | 2004-093310 A | 3/2004 |
| JP | 2004294328 A | 10/2004 |
| JP | 3807600 B2 | 8/2006 |
| JP | 2009257921 A | 11/2009 |
| JP | 2010-091311 A | 4/2010 |
| JP | 5203025 B2 | 6/2013 |
| JP | 2014-145625 A | 8/2014 |
| JP | 6730056 B2 | 7/2020 |
| JP | 2021533339 A * | 12/2021 |
| KR | 100609510 B1 | 8/2006 |
| KR | 101116364 B1 | 3/2012 |
| KR | 101400559 B1 | 6/2014 |
| KR | 2020-0084530 A | 7/2020 |
| KR | 20210027602 A * | 3/2021 |
| TW | 201331952 A | 8/2013 |
| TW | 201530111 A | 8/2015 |
| WO | 02054057 A1 | 7/2002 |

OTHER PUBLICATIONS

Extended European Search Report including Written Opinion for Application No. 22907634.4 dated Jul. 23, 2024, pp. 1-9.
Liu, J. Y. et al., "Chemical structure and pyrolysis response of B-O-4 lignin model polymer", Bioresources, vol. 6, No. 2, May 2011, pp. 1079-1093, XP093151718.
Extended European Search Report including Written Opinion for Application No. 22799070.2 dated Apr. 26, 2024, pp. 1-12, Nov. 7, 2024.
Zhang, X. et. al., Sequential fractionation of lignin-derived pyrolysis oil via extraction with a combination of water and organic solvents, BioR Resources, Jan. 2019, vol. 14, No. 1, p. 2144-2159.

* cited by examiner

FIG. 10

HIGH-TEMPERATURE-GAS COLLECTION APPARATUS AND METHOD

CROSS-REFERENCE TO RELATED APPLICATIONS

This application is a national stage entry under 35 § 371 of International Application No. PCT/KR2022/006223, filed on May 2, 2022, which claims priority to Korean Patent Application No. 10-2021-00585592 filed on May 6, 2021, Korean Patent Application No. 10-2021-0070790 filed on Jun. 1, 2021, and Korean Patent Application No. 10-2022-0053755, filed on Apr. 29, 2022, the entire disclosures of which are hereby incorporated herein by reference in their entireties.

The present disclosure relates to an apparatus and method for collecting high temperature gas, and more specifically, to an apparatus and method for stably collecting high temperature gas generated from a sample in a high temperature environment.

BACKGROUND ART

Materials that generate heat by themselves during operation or use, or used in various materials or products given high temperature environmental conditions may discharge various components that have been frozen or absorbed in materials as outgas as the materials acquire heat.

Outgas generated from materials and products contains not only solvents but also organic low-molecular substances, it may cause troubles in manufacturing equipment or final products (especially electronic products), and contains harmful ingredients that affect the human body, so outgas analysis is necessary, and the importance of it has been increasingly highlighted in recent years.

For example, the demand for outgas analysis from various materials such as organic light emitting diodes (OLED) materials, polyimide substrates, and lithium cobalt oxide (LCO) cathode materials is increasing, and accordingly, new outgas evaluation technology is being requested.

In order to accurately analyze the material as described above, it is necessary to collect the outgas generated by heating in a condition of 350° C. or higher. However, according to a related art, a thermal desorption sampler (TD sampler) can only be used in a condition of less than 350° C., and in case of a usable pyrolysis machine, only a small amount of sample could be injected, so it was not possible to collect a sufficient amount of outgas for analysis.

In addition, as the application range of materials such as organic light emitting diodes (OLED) materials, polyimide substrates, and lithium cobalt oxide (LCO) cathode materials has been expanded, the temperature environment in which the materials are used has also been diversified, and the need to analyze outgas which is differently generated according to environmental regulations is also growing.

Therefore, there is a need for a method capable of stably collecting outgas for each temperature section for various samples.

DISCLOSURE OF INVENTION

Technical Goals

The present disclosure relates to an apparatus and method for collecting high temperature gas and may be to provide an apparatus and method for stably collecting high temperature gas generated from a sample in a high temperature environment.

Technical objects to be achieved by the present disclosure are not limited to the technical problems mentioned above, and other technical objects not mentioned will be clearly understood from the description below by those of ordinary skill in the art to which the present disclosure pertains.

Technical Solutions

An apparatus for collecting high temperature gas of an example embodiment includes:
  a sample tube extending in a first direction, a sample being accommodated in an sample accommodating space inside the sample tube;
  a first stopper coupled to one end of the sample tube;
  a second stopper coupled to the other end of the sample tube; and
  a heating furnace configured to heat the sample by accommodating the sample tube in a heating space therein such that the first stopper and the second stopper protrude to the outside, and
  an inlet for injecting a carrier gas into the sample accommodating space is formed in the first stopper, and
  an outlet for discharging an analysis target gas generated in the sample accommodating space is formed in the second stopper.

Advantageous Effects

According to an apparatus for collecting high temperature gas of example embodiments of the present disclosure, it is possible to collect outgas generated in a high temperature environment up to 1000° C., and minimize adsorption of outgas containing polar volatile organic compound (VOC) in a flow path connected from a sample tube to a gas collector, thereby enhancing analysis efficiency and accuracy.

According to an apparatus and method for collecting high temperature gas of example embodiments of the present disclosure, it is possible to provide temperature conditions such as heating temperature, temperature raising rate, and temperature raising time to a sample, and separate and collect outgas generated from the sample according to different temperature conditions.

According to an apparatus for collecting high temperature gas of example embodiments of the present disclosure, it is possible to collect high temperature outgas without limitation for samples of various specifications.

BEST MODE

An apparatus for collecting high temperature gas of an example embodiment includes:
- a sample tube extending in a first direction, a sample being accommodated in an sample accommodating space inside the sample tube;
- a first stopper coupled to one end of the sample tube;
- a second stopper coupled to the other end of the sample tube; and
- a heating furnace configured to heat the sample by accommodating the sample tube in a heating space therein such that the first stopper and the second stopper protrude to the outside, and
- an inlet for injecting a carrier gas into the sample accommodating space is formed in the first stopper, and
- an outlet for discharging an analysis target gas generated in the sample accommodating space is formed in the second stopper.

In the apparatus for collecting high temperature gas of an example embodiment, the heating space may include a first heating space closest to the first stopper, a second heating space closest to the second stopper, and a third heating space provided between the first heating space and the second heating space, and the sample accommodated in the sample tube may be located in the third heating space.

In the apparatus for collecting high temperature gas of an example embodiment, a main heating part configured to heat the sample may be provided in the third heating space, and an auxiliary heating part configured to maintain the analysis target gas at a predetermined temperature or higher may be provided in the second heating space.

In the apparatus for collecting high temperature gas of an example embodiment, a heater insertion groove to which a cartridge heater is inserted may be provided on the second stopper.

In the apparatus for collecting high temperature gas of an example embodiment, a plurality of the heater insertion grooves may be provided.

In the apparatus for collecting high temperature gas of an example embodiment, the outlet may be formed on one surface of the second stopper, and the plurality of heater insertion grooves may be located on the circumference of a virtual circle having the outlet as a central point on the one surface of the second stopper.

In the apparatus for collecting high temperature gas of an example embodiment, a temperature of the third heating space may be higher than the temperature of the second heating space, and the temperature of the second heating space may be higher than the temperature of the second stopper.

In the apparatus for collecting high temperature gas of an example embodiment, the third heating space may be maintained at a temperature of 25° ° C. to 1000° C., the second heating space may be maintained at a temperature of 25° C. to 500° ° C., and the temperature of the second stopper may be maintained at a temperature of 25° C. to 150° C.

In the apparatus for collecting high temperature gas of an example embodiment, a length of the first heating space and the second heating space in the first direction may be 15% to 100% of the length of the third heating space in the first direction.

In the apparatus for collecting high temperature gas of an example embodiment, a quartz tube may be provided as the sample tube.

In the apparatus for collecting high temperature gas of an example embodiment, a plurality of steps may be provided on an inner circumferential surface of the outlet of the second stopper, and an inner diameter of the step located close to an entrance side of the outlet may be formed larger.

The apparatus for collecting high temperature gas of an example embodiment may further include:
- a carrier gas supplier connected to the inlet through a first flow path and configured to supply the carrier gas to the sample accommodating space;
- a plurality of gas collector configured to receive and collect the analysis target gas generated in the sample accommodating space inside the sample tube; and
- an opening and closing part connected to the other end of the sample tube through a second flow path and configured to receive the analysis target gas of the sample accommodating space through the second flow path and selectively deliver the analysis target gas to one gas collector among the plurality of gas collectors.

The apparatus for collecting high temperature gas of an example embodiment may further include:
- a carrier gas preheater provided in the first flow path and configured to preheat the carrier gas passing through the first flow path; and
- a mass flow controller provided upstream of the carrier gas preheater on the first flow path and configured to control a flow rate of the carrier gas injected into the sample tube.

The apparatus for collecting high temperature gas of an example embodiment may further include a temperature maintainer configured to heat the opening and closing part to maintain a temperature of the analysis target gas passing through the opening and closing part at a predetermined level or higher.

In the apparatus for collecting high temperature gas of an example embodiment, the plurality of gas collectors are selected from an adsorbent tube, a DNPH cartridge, an impinger, and a Tedlar bag.

In the apparatus for collecting high temperature gas of an example embodiment, the opening and closing part may include a first opening to which the second flow path is connected, a plurality of second openings to which the plurality of gas collectors are connected, and a variable flow path selectively connected to the first opening and one second opening of the plurality of second openings.

A method of collecting high temperature gas of an example embodiment may include:
- a first temperature maintaining operation of maintaining the sample at a first temperature for a first predetermined time;
- a temperature raising operation of heating the sample to a second temperature higher than the first temperature at a predetermined temperature raising rate; and
- a second temperature maintaining operation of maintaining the sample at the second temperature for a second predetermined time, and
- the carrier gas is continuously injected into the sample tube through the carrier gas supplier during the first temperature maintaining operation, the temperature raising operation, and the second temperature maintaining operation, and the analysis target gas generated from the sample during the first temperature maintaining operation, the temperature raising operation, and the second temperature maintaining operation is collected in the gas collector.

In the method of collecting high temperature gas of an example embodiment, the plurality of gas collectors may include a first gas collector, a second gas collector, and a third gas collector, the analysis target gas generated in the first temperature maintaining operation may be collected in the first gas collector, the analysis target gas generated in the temperature raising operation may be collected in the second gas collector, and the analysis target gas generated in the second temperature maintaining operation may be collected in the third gas collector.

In the temperature raising operation of the method of collecting high temperature gas of an example embodiment, the predetermined temperature raising rate may be 0.1° C./min to 100° C./min.

MODES FOR CARRYING OUT THE INVENTION

Hereinafter, an example embodiment according to the present disclosure will be described in detail with reference to the accompanying drawings. Here, the size or shape of components shown in the drawings may be exaggerated for clarity and convenience of explanation. In addition, terms specifically defined in consideration of the configuration and operation of the present disclosure may vary depending on the intention or custom of a user or operator. Definitions of these terms should be made based on the context throughout this specification.

In the description of the present disclosure, it should be noted that orientation or positional relationships indicated by the terms such as "center", "upper", "lower", "left", "right", "vertical", "horizontal", "inside", "outside", "one side", and "the other side" are based on orientation or positional relationships shown in the drawings or orientation or positional relationships usually of disposition when a product according to the present disclosure is used, are merely for the description and brief illustration of the present disclosure, and should not be construed as limiting the present disclosure because they are not suggesting or implying that the indicated apparatus or element must be configured or operated in the specified orientation with the specified orientation.

Figure 1:
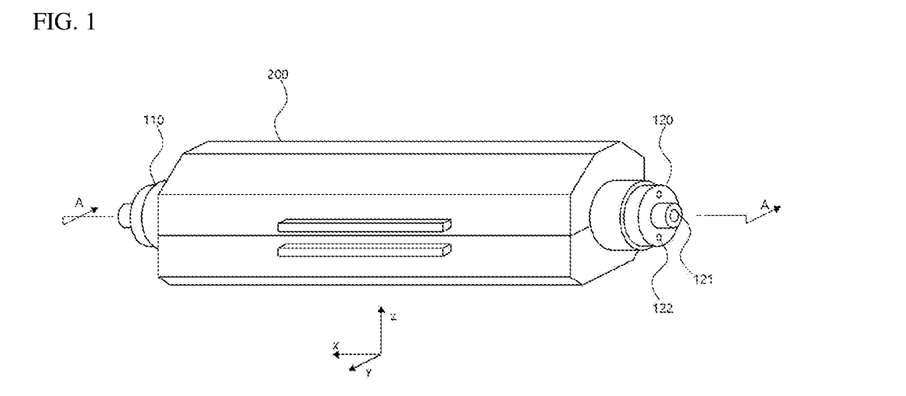
FIG. 1 is a perspective view illustrating an apparatus for collecting high temperature gas of the present disclosure.
Figure 2:
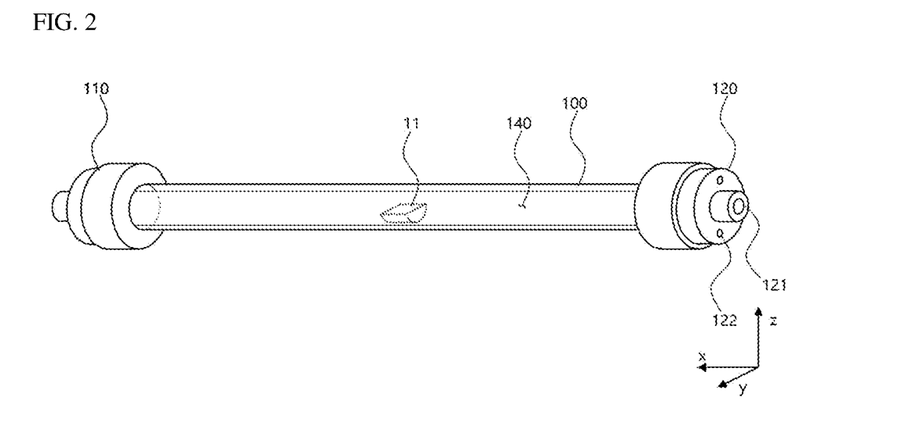
FIG. 2 is a perspective view illustrating a sample tube.
Figure 3:
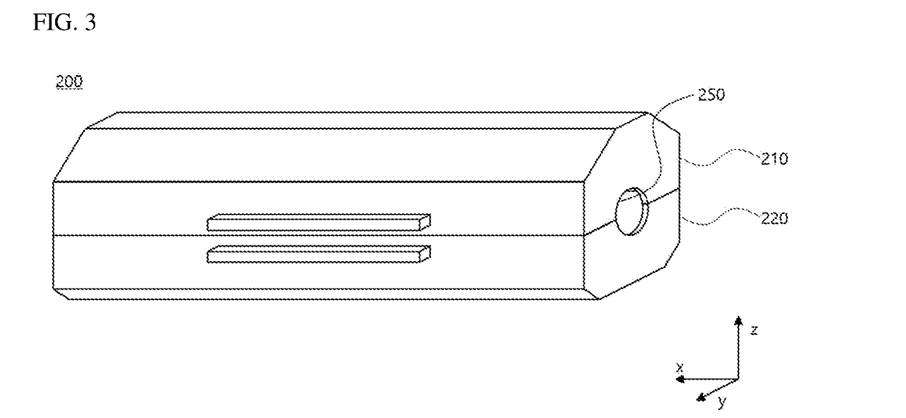
FIG. 3 is a perspective view illustrating a heating furnace.
Figure 4:
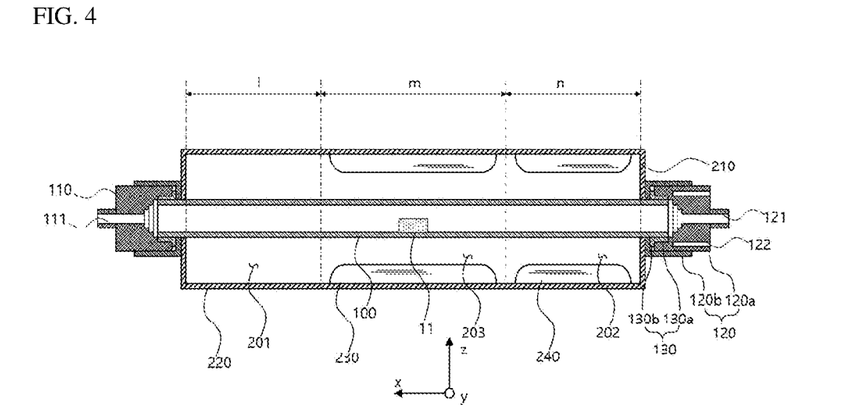
FIG. 4 is a cross-sectional view taken along a line A-A of FIG. 1.
Figure 5A:
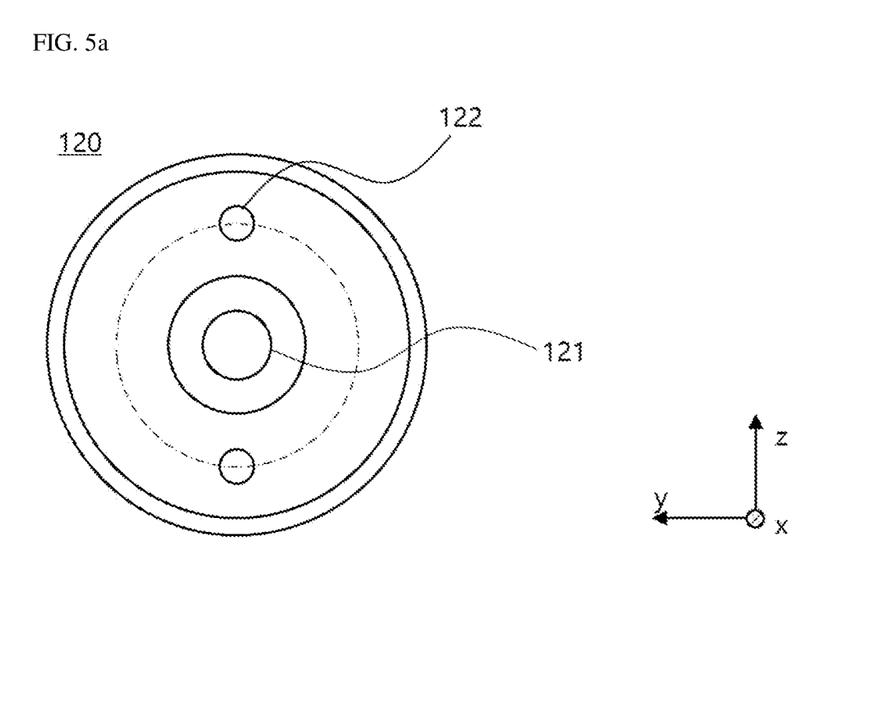
FIGS. 5A to 5C are plan views illustrating a second stopper.
Figure 5B:
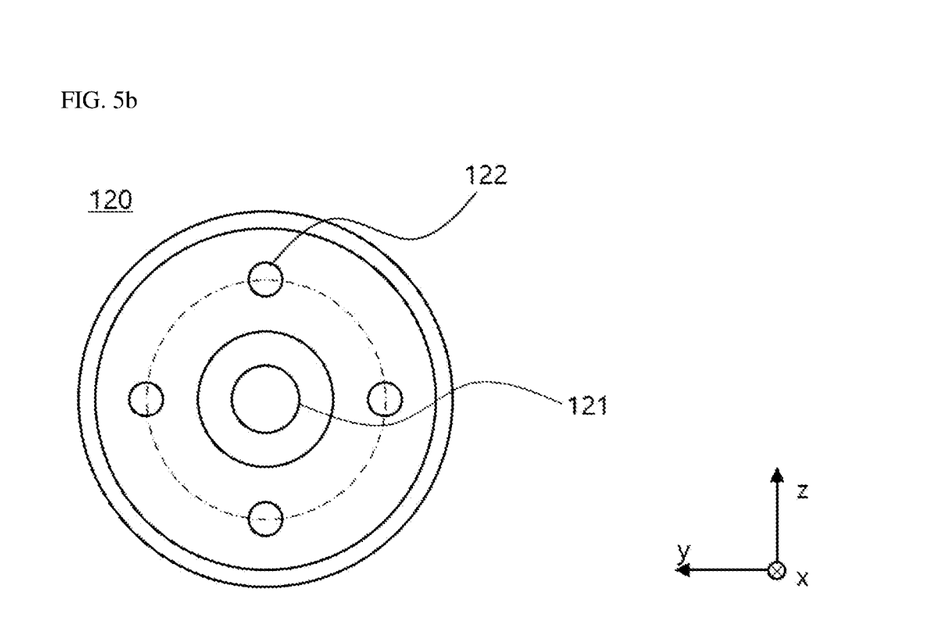
Figure 5C:
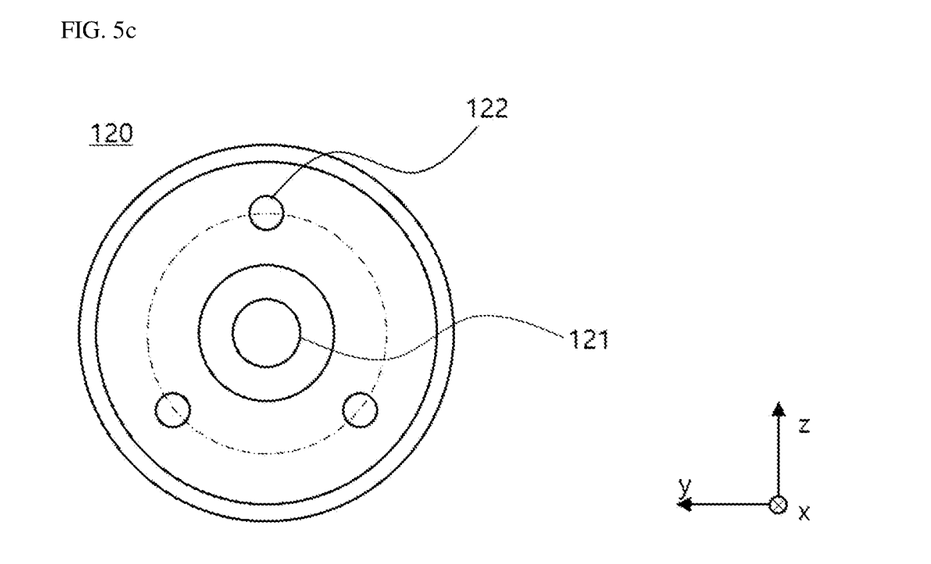
Figure 6A:
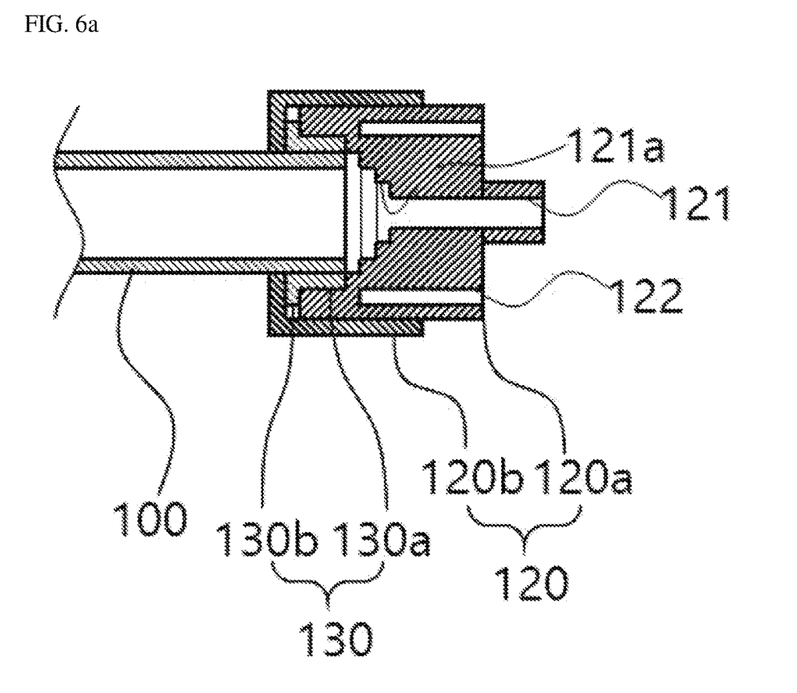
FIGS. 6A to 6C are cross-sectional views illustrating the second stopper.
Figure 6B:
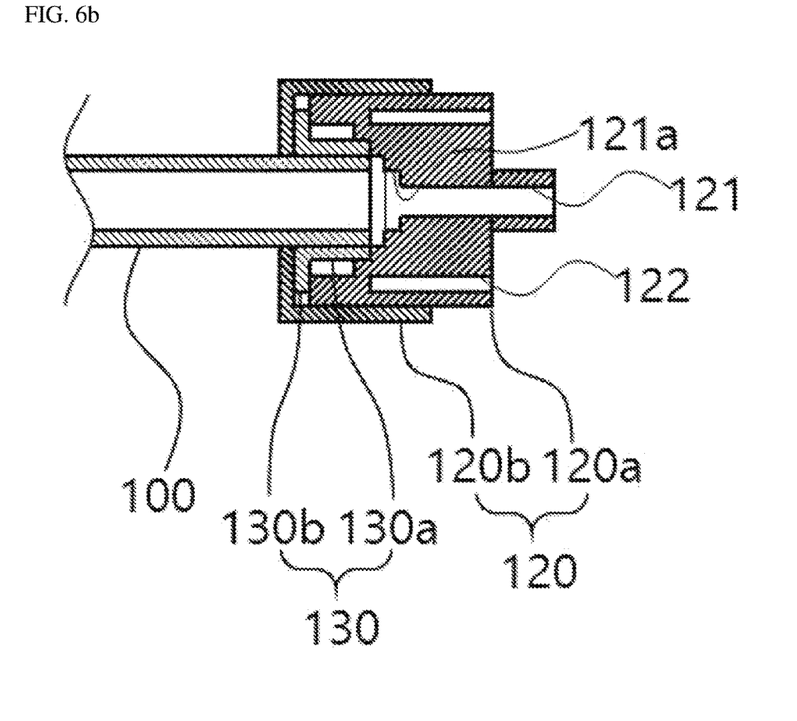
Figure 6C:
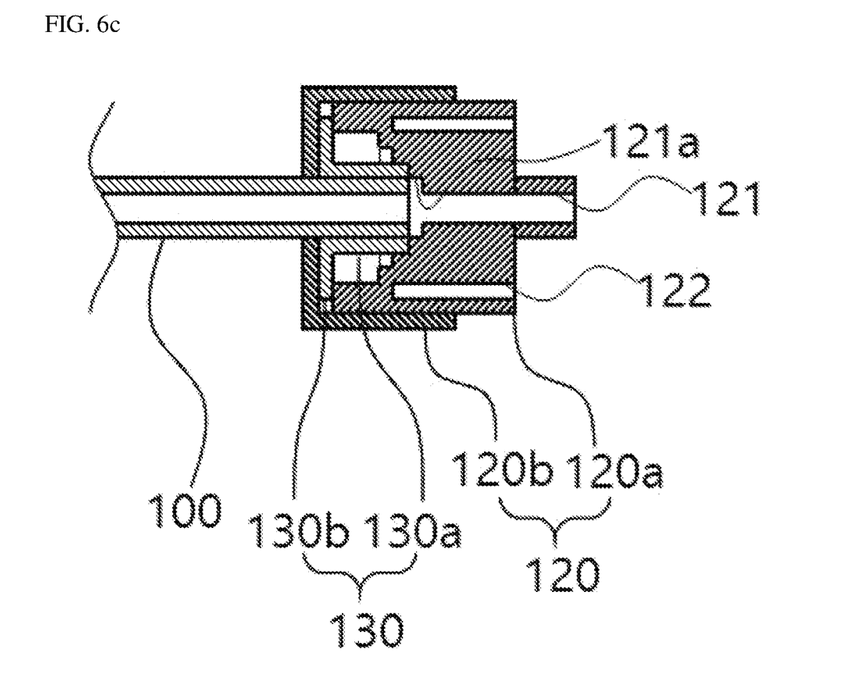
Figure 7:
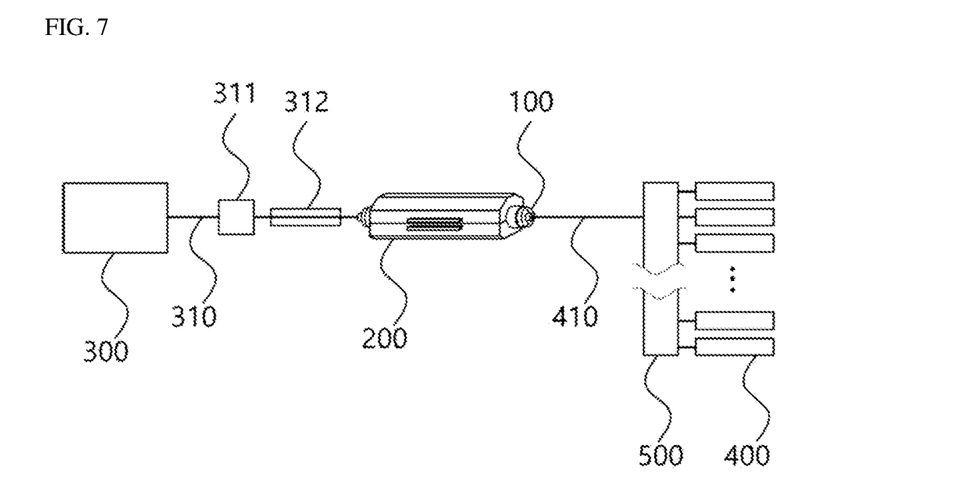
FIG. 7 is a block diagram illustrating the apparatus for collecting high temperature gas of the present disclosure.
Figure 8:
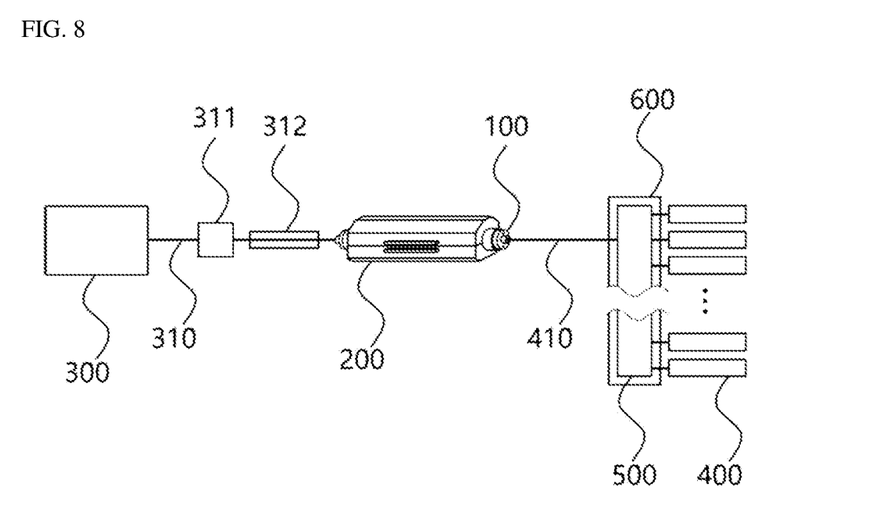
FIG. 8 is a block diagram illustrating another example embodiment of the apparatus for collecting high temperature gas of the present disclosure.
Figure 9:
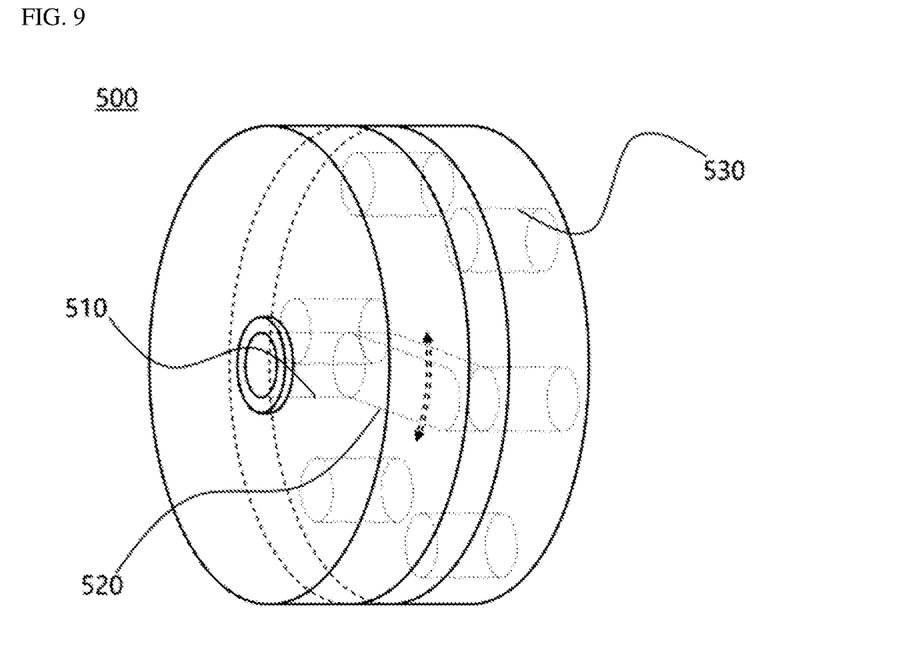
FIG. 9 is a perspective view illustrating an opening and closing part.
Figure 10:
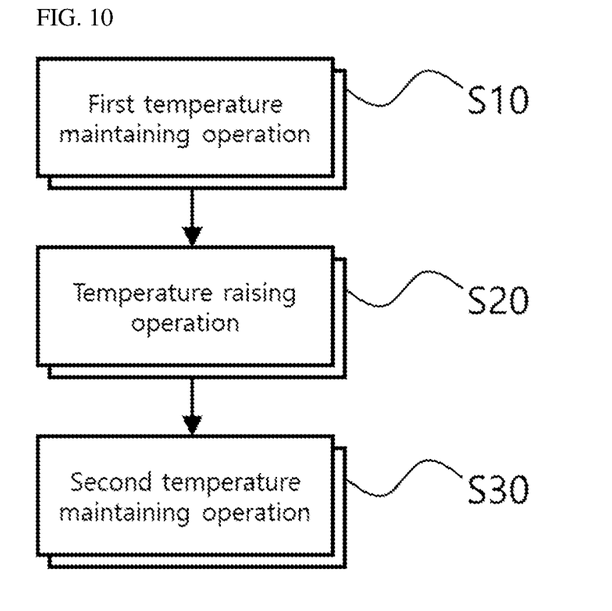
FIG. 10 is a block diagram illustrating a method of collecting high temperature gas of the present disclosure.

FIG. 1 is a perspective view illustrating an apparatus for collecting high temperature gas of the present disclosure. FIG. 2 is a perspective view illustrating a sample tube 100. FIG. 3 is a perspective view illustrating a heating furnace 200. FIG. 4 is a cross-sectional view taken along a line A-A of FIG. 1. FIGS. 5A to 5C are plan views illustrating a second stopper 120. FIGS. 6A to 6C are cross-sectional views illustrating the second stopper. FIG. 7 is a block diagram illustrating the apparatus for collecting high temperature gas of the present disclosure. FIG. 8 is a block diagram illustrating another example embodiment of the apparatus for collecting high temperature gas of the present disclosure. FIG. 9 is a perspective view illustrating an opening and closing part. FIG. 10 is a block diagram illustrating a method of collecting high temperature gas of the present disclosure.

Hereinafter, the apparatus and method for collecting high temperature gas of the present disclosure will be described in detail with reference to FIGS. 1 to 10.

As shown in FIG. 1, the apparatus for collecting high temperature gas of an example embodiment of the present disclosure may include,
the sample tube 100 extending in a first direction, a sample 11 being accommodated in a sample accommodating space 140 inside the sample tube;
a first stopper 110 coupled to one end of the sample tube 100;
the second stopper 120 coupled to the other end of the sample tube 100; and
the heating furnace 200 configured to heat the sample 11 by accommodating the sample tube 100 in a heating space therein such that the first stopper 110 and the second stopper 120 protrude to the outside.

In FIGS. 1 to 5, the first direction may be an x-axis direction, and an up-down direction may be a z-axis direction.

In the apparatus for collecting high temperature gas of the present disclosure, an inlet 111 configured to inject a carrier gas into the sample accommodating space 140 may be formed in the first stopper 110, and an outlet 121 configured to discharge an analysis target gas generated in the sample accommodating space 140 may be formed in the second stopper 120. The apparatus for collecting high temperature gas of the present disclosure may move the analysis target gases generated from the sample 11 as a carrier gas and collect them in a gas collector 400 connected to the outlet 121. In other words, the apparatus for collecting high temperature gas of the present disclosure may be an open circuit system in which the carrier gas continuously flows through the sample tube 100 while collecting the analysis target gas.

In the apparatus for collecting high temperature gas of the present disclosure, the sample 11 may be an organic light emitting diode (OLED) material, a polyimide substrate, a lithium cobalt oxide (LCO) cathode material, or the like, but is not limited thereto.

As shown in FIG. 2, in the sample tube 100, a hollow may be formed as the sample accommodating space 140 extending in the first direction therein. Both ends of the sample tube 100 in the first direction are provided in an open state, and the first stopper 110 and the second stopper 120 are respectively coupled to the open both ends, so that the sample accommodating space 140 may be formed as a closed space. The sample tube 100 may be a quartz tube. The shape of the sample tube 100 may be provided in various shapes such as a straight line type, a spring type, a curved type, and the like. A sealing member 130 may be inserted between the sample tube 100 and the first stopper 110 and between the sample tube 100 and the second stopper 120. The sealing member may be a ring-shaped ferrule gasket.

The length of the sample tube 100 in the first direction may be 200 mm to 600 mm. The length of the sample tube 100 in the first direction may be longer than the length of the heating space in the first direction. For example, the length of the sample tube 100 in the first direction may be formed to be 400 mm.

The sample tube 100 may have a diameter of 0.5 cm to 3 cm. The diameter of the sample tube 100 may be determined in a range that can accommodate the size of the sample 11 in which the analysis target gas can be sufficiently generated. In addition, the apparatus for collecting high temperature gas of the present disclosure is a system in which the carrier gas continuously flows during collecting gas, if the diameter of the sample tube 100 is excessively large, it may be difficult to stably carry the analysis target gas with an appropriate amount of carrier gas. Accordingly, in consideration of the above, the diameter of the sample tube 100 may be 0.5 cm to 3 cm.

The apparatus for collecting high temperature gas of the present disclosure has a structure in which the sample tube 100 is detachable from the heating furnace 200, and according to the specification of the sample 11, it is possible to select the sample tube 100 of an appropriate specification and use it in combination with the heating furnace 200. In addition, since the replacement of the sample tube 100 is easy, in the case of the sample 11 in which a hazardous substance is generated as the analysis target gas, it is possible to completely separate the sample tube 100 from the heating furnace 200 to stably replace the sample 11.

Both ends of the sample tube 100 may protrude to the outside of the heating furnace 200 through through-holes 250 respectively provided on both side walls of the heating furnace 200. Both ends of the sample tube 100 protruding from the heating furnace 200 may be coupled to the first stopper 110 and the second stopper 120 respectively.

As shown in FIGS. 3 and 4, the heating furnace 200 may include a lower jig 220 covering the lower side of the sample tube 100, and an upper jig 210 covering the upper side of the sample tube 100 and coupled to the upper end of the lower jig 220.

The upper jig 210 forms a hollow inside so that the lower part is open, the lower jig 220 forms a hollow inside so that the upper part is open, and the upper jig 210 and the lower jig 220 may be coupled to form the heating space. The through hole 250 through which the sample tube 100 passes through may be located at a boundary line formed by combining the upper jig 210 and the lower jig 220. Therefore, in a state in which the upper jig 210 and the lower jig 220 are separated, it is possible to align the sample tube 100 with the through hole 250 and dispose on the lower jig 220, and then cover the lower jig 220 with the upper jig 210 to mount the sample tube 100 on the heating furnace 200.

The heating space may be a space formed by combining the hollow of the upper jig 210 and the hollow of the lower jig 220 to face each other.

As shown in FIG. 4, the heating space may include a first heating space 201 closest to the first stopper 110, a second heating space 202 closest to the second stopper 120, and a third heating space 203 provided between the first heating space 201 and the second heating space 202, and the sample 11 accommodated in the sample tube 100 may be located in the third heating space 203.

In other words, the sample tube 100 may be disposed on the heating furnace 200 so as to span the first heating space 201, the second heating space 202 and the third heating space 203, and the sample 11 may be located in a position corresponding to the third heating space 203 among the inside of the sample tube 100.

A main heating part 230 for heating the sample 11 may be provided in the third heating space 203, and an auxiliary heating part 240 for maintaining the analysis target gas at a predetermined temperature or higher may be provided in the second heating space 202.

The main heating part 230 may be a lamp heater, an induction heating heater, a dielectric heating heater, a coil heater, or the like. The main heating part 230 may heat the sample 11 through radiant heat. The main heating part 230 is capable of heating the sample 11 at a temperature of 25° C. (room temperature) to 1000° C., and may be a heater capable of setting a temperature up to 1000° C.

The auxiliary heating part 240 may be a lamp heater, an induction heating heater, a dielectric heating heater, a coil heater, or the like. The auxiliary heating part 240 may prevent the gas generated from the sample 11 from being cooled below a predetermined temperature. The auxiliary heating part 240 may be operated at a temperature of 500° C. or less.

As shown in FIG. 4 and FIGS. 5A to 5C, the second stopper 120 may be provided with a heater insertion groove 122 for inserting a cartridge heater.

The cartridge heater inserted into the heater insertion groove 122 may be a heater having a built-in heating wire for emitting heat into a rod-shaped housing. In other words, the cartridge heater may be provided in a bar shape, and the heater insertion groove 122 may be provided in a shape corresponding to the outer shape of the cartridge heater. Heat generated in the cartridge heater may be transferred to the analysis target gas passing through the outlet 121 through heat conduction. The outer circumferential surface of the cartridge heater may be in close contact with the inner circumferential surface of the heater insertion groove 122.

As shown in FIGS. 5A to 5C, the heater insertion groove 122 may be provided in plurality. The outlet 121 may be formed on one surface of the second stopper 120, and the plurality of heater insertion grooves 122 may be located on the circumference of a virtual circle with the outlet 121 as a central point on the one surface of the second stopper 120. The plurality of heater insertion grooves 122 may be arranged at regular intervals on the virtual circumference. Accordingly, the heat distribution of the analysis target gas passing through the outlet 121 may be uniformly maintained.

The temperature of the third heating space 203 may be higher than the temperature of the second heating space 202, and the temperature of the second heating space 202 may be higher than the temperature of the second stopper 120. For example, the third heating space 203 may be maintained at a temperature of 25° C. to 1000° C., the second heating space 202 may be maintained at a temperature of 25° C. to 500° C., the second stopper 120 may be maintained at a temperature of 25° C. to 150° C. The temperature of the third heating space 203 may be maintained at a temperature for applying heat to the sample 11, and the temperature of the second heating space 202 and the second stopper 120 may be maintained at a level that the analysis target gas is not to be adsorbed to the flow path. The temperature of the second stopper 120 may be set in consideration of the heat resistance of the sealing member 130. For example, when the sealing member 130 is provided with a Teflon ferrule, the maximum value of the temperature of the second stopper 120 may be set to 150° C. or less, which is the heat resistance temperature of the Teflon material.

As shown in FIG. 4, the second stopper 120 may include a body part 120a in which the outlet 121 and the heater insertion groove 122 are formed, and a fixing part 120b fixing the sealing member 130 to the body part 120a. The sealing member 130 may include a tube part 130a provided in a tubular shape and inserted into the entrance of the outlet 121 formed on one side of the body part 120a, and a wing part 130b protruding in a ring shape along the outer circumferential surface of the tube part 130a. In this case, the fixing part 120b may be coupled to the body part 120a while covering one side of the body part 120a with the wing part 130b interposed therebetween. An opening may be formed in the fixing part 120b at a position facing the entrance of the outlet 121 formed on one side of the body part 120a. The other end of the sample tube 100 may be inserted into the tube part 130a through the opening of the fixing part 120b. In other words, the tube part 130a of the sealing member 130 may be positioned between the inner circumferential surface of the outlet 121 and the outer circumferential surface of the sample tube 100. The body part 120a and the fixing part 120b may be coupled by screwing. A screw thread may be formed on the outer circumferential surface of the body part 120a and the inner circumferential surface of the fixing part 120b, and may be screwed through the formed screw thread.

As shown in FIG. 4 and FIGS. 6A to 6C, the entrance-side inner diameter of the outlet 121 may be larger than the exit-side inner diameter. A plurality of steps 121a may be provided on the inner circumferential surface of the outlet 121 in a stair type, and the inner diameter of the steps located close to the entrance side of the outlet 121 may be larger.

As shown in FIGS. 6A to 6C, whenever the specification (diameter) of the sample tube 100 is changed, the tube part 130a of the sealing member 130 may be provided to correspond to the specification of the sample tube 100. Specifically, the tube part 130a may be provided so that the inner circumferential surface is in close contact with the outer circumferential surface of the sample tube 100, the outer circumferential surface of the tube part 130a may be in close contact with the inner circumferential surface of one of the plurality of steps 121a. Therefore, the sample tube 100 of various specifications may be easily coupled to the apparatus for collecting high temperature gas of the present disclosure by simply replacing only the sealing member 130.

The first stopper 110 may also be provided in the same structure as the second stopper 120. However, the heater insertion groove may be added to or lacking in the first stopper 110 as necessary.

As shown in FIG. 4, the apparatus according to the present disclosure includes the first to third heating spaces.

A boundary of the third heating space 203 in the first direction may be both ends of the main heating part 230 in the first direction. In other words, the length of the third heating space 203 in the first direction may be defined as the length of the main heating part 230 in the first direction.

The boundary of the first heating space 201 in the first direction may be from an inner wall adjacent to the first stopper 110 among two inner walls vertical to the first direction in the inner space of the heating furnace 200 to one end of the main heating part 230.

The boundary of the second heating space 202 in the first direction may be from an inner wall adjacent to the second stopper 120 among two inner walls vertical to the first direction in the inner space of the heating furnace 200 to the other end of the main heating part 230.

The length of the first heating space 201 and the second heating space 202 in the first direction may be a distance secured to protect the sealing member 130 from heat emitted by the main heating part 230.

The length of the first heating space 201 and the second heating space 202 in the first direction may be 15% or more or 25% or more of the length of the third heating space 203 in the first direction, and 100% or less, 80% or less, or 50% or less. For example, the length m of the third heating space 203 in the first direction may be about 100 mm to about 300 mm, and the length 1 of the first heating space 201 in the first direction may be about 50 mm to about 150 mm, and the length n of the second heating space 202 in the first direction may be about 50 mm to about 150 mm. For example, the length of the third heating space 203 in the first direction may be about 200 mm, the length of the first heating space 201 in the first direction may be about 100 mm, and the length of the the second heating space 202 in the first direction may be about 100 mm.

The first heating space 201 may be a section for the carrier gas introduced from the outside to adapt to the internal temperature of the heating furnace 200. In other words, the first heating space 201 may be a section for preventing the cold carrier gas from cooling the sample 11. The temperature of the first heating space 201 may be maintained by receiving heat emitted from the third heating space 203 or may be operated by having a separate heater by itself. The length of the first heating space 201 may be determined based on the injection rate, injection amount, or the temperature of the third heating space 203 of the carrier gas.

As shown in FIG. 7, the apparatus for collecting high temperature gas of the present disclosure may further include a carrier gas supplier 300 connected to the inlet 111 through a first flow path 310 and configured to supply the carrier gas to the sample accommodating space 140, a plurality of gas collectors 400 configured to receive and collect the analysis target gas generated in the sample accommodating space 140 inside the sample tube 100, and an opening and closing part 500 connected to the other end of the sample tube 100 through a second flow path 410 configured to receive the analysis target gas of the sample accommodating space 140 through the second flow path 410 and selectively deliver the analysis target gas to one gas collector 400 of the plurality of gas collectors 400.

The gas collector 400 may be selected from an adsorbent tube, a DNPH cartridge, an impinger, and a Tedlar bag.

The adsorbent tube may be one capable of adsorbing the generated components of the analysis target gas and maintaining the adsorbed state for a predetermined period of time. The adsorbent tube may have an adsorbent. The adsorbent may be activated carbon having a porous structure.

The DNPH cartridge may be one commonly used in the industry for analyzing aldehydes and carbonyl compounds.

The impinger may be an apparatus for bubbling and collecting inorganic gas.

The Tedlar bag may be a gas sampling bag manufactured by CEL Scientific, USA.

The carrier gas supplied from the carrier gas supplier 300 is chemically inert to the sample 11 and the analysis target gas, and may be hydrogen, helium, nitrogen, argon gas, or the like.

As shown in FIG. 7, the apparatus for collecting high temperature gas of the present disclosure may further include a carrier gas preheater 312 provided in the first flow path 310 and configured to preheat the carrier gas passing through the first flow path 310, and a mass flow controller 311 provided upstream of the carrier gas preheater on the first flow path 310 and configured to control a flow rate of the carrier gas injected into the sample tube.

The mass flow controller 311 for controlling the flow rate of the carrier gas injected into the sample accommodating space 140 may be provided in the first flow path 310. The apparatus for collecting high temperature gas of the present disclosure is an open system in which the carrier gas is injected and discharged in real time, and the amount of the carrier gas may be controlled for accurate temperature control. Since the temperature at the outlet 121 side or downstream of the carrier gas preheater 312 may vary depending on experimental conditions, the mass flow controller 311, which may be controlled by the temperature, may be provided on the front-end of the inlet 111 or the front-end carrier gas preheater 312.

The carrier gas preheater 312 may be provided as a heater in the form of a sheet including a heating wire, and may be installed to surround the outer circumferential surface of the first flow path 310. The carrier gas preheater 312 may heat the carrier gas to a temperature of 25° ° C. to 300° C. The carrier gas preheater 312 may be controlled in consideration of the temperature of the sample 11 and the flow rate of the carrier gas.

As shown in FIG. 8, the apparatus for collecting high temperature gas of the present disclosure may further include a temperature maintainer 600 configured to heat the opening and closing part 500 to maintain the temperature of the analysis target gas passing through the opening and closing part 500 at a predetermined level or higher. The temperature maintainer 600 may be provided in a form of an oven. The temperature maintainer 600 accommodates and heats only the opening and closing part 500 therein, and the heat generated in the temperature maintainer 600 may be blocked from being transmitted to the gas collector 400. If necessary, an insulating material may be provided between the opening and closing part 500 and the gas collector 400. The temperature maintainer 600 may maintain the opening and closing part 500 at a temperature of 25° C. to 150° C.

As shown in FIG. 9, the opening and closing part 500 may include a first opening 510 to which the second flow path 410 is connected, a plurality of second openings 530 to which the plurality of gas collectors 400 are connected, and a variable flow path 520 selectively connected to the first opening 510 and one second opening 530 among the plurality of second openings 530.

Specifically, the entrance of the first opening 510 may be connected to the outlet 121, and the exit of the first opening 510 may be connected to one end of the variable flow path 520. The variable flow path 520 may have one end located at the center of the rotating shaft and may extend in a direction vertical to the rotating shaft. The variable flow path 520 may rotate around the rotating shaft while one end thereof is fixed. The plurality of second openings 530 may be arranged on the virtual circumference drawn by the other end of the variable flow path 520. In other words, the variable flow path 520 may be selectively connected to one of the plurality of second openings 530 while rotating. In other words, the plurality of second openings 530 may be disposed on the virtual circumference having the first opening 510 as a central point, and the variable flow path 520 may extend on the virtual circumference in the diameter direction.

As shown in FIG. 10, the method of collecting high temperature gas may include,
   a first temperature maintaining operation of maintaining the sample 11 at a first temperature for a first predetermined time (S10);
   a temperature raising operation of heating the sample 11 to a second temperature higher than the first temperature at a predetermined temperature raising rate (S20); and
   a second temperature maintaining operation of maintaining the sample 11 at the second temperature for a second predetermined time (S30).

The carrier gas may be continuously injected into the sample tube 100 through the carrier gas supplier 300 during the first temperature maintaining operation (S10), the temperature raising operation (S20) and the second temperature maintaining operation (S30), and the analysis target gas generated from the sample 11 during the first temperature maintaining operation (S10), the temperature raising operation (S20) and the second temperature maintaining operation (S30) may be collected in the gas collector 400.

The plurality of gas collectors 400 includes a first gas collector, a second gas collector and a third gas collector, and the analysis target gas generated in the first temperature maintenance operation (S10) may be collected in the first gas collector, the analysis target gas generated in the temperature raising operation (S20) may be collected in the second gas collector, and the analysis target gas generated in the second temperature maintaining operation (S30) may be collected in the third gas collector.

In other words, in the first temperature maintaining operation (S10), the variable flow path 520 of the opening and closing part 500 may be connected to the second opening 530 connected to the first gas collector, in the temperature raising operation (S20), the variable flow path 520 may be connected to the second opening 530 connected to the second gas collector, and in the second temperature maintaining operation (S30), the variable flow path 520 may be connected to the second opening 530 connected to the third gas collector.

In the temperature raising operation (S20), the predetermined temperature raising rate may be 0.1° C./min to 100° C./min.

Example 1

As the apparatus shown in FIG. 4, an apparatus in which the length of the first heating space 201 and the second heating space 202 is about 100 mm, and the length of the third heating space 203 is about 200 mm was used.

As an analysis target sample 11, ABS pellets were disposed in the sample accommodating space 140. The third heating space 203 was maintained at 250° C., the results of collecting and analyzing the gas generated from the sample while maintaining the second heating space at 200° C. are shown in Table 1.

Comparative Example 1

The same apparatus and sample as in Example 1 were used, but the third heating space 203 was maintained at 250° C., and the gas generated from the sample was collected while maintaining the second heating space at room temperature. The results of analyzing the collected gas are shown in Table 1.

TABLE 1

| | | | Gas component(μg/g) | |
|---|---|---|---|---|
| Number | Rt(min) | Gas component | Comparative Example 1 | Example 1 |
| 1 | 2.8 | acrylonitrile | 13 | 15 |
| 2 | 5.0 | toluene | 50 | 50 |
| 3 | 6.6 | butadiene dimer | 25 | 23 |
| 4 | 7.4 | ethyl benzene | 100 | 99 |
| 5 | 7.6 | xylene | 2 | 3 |
| 6 | 8.2 | styrene | 1069 | 1078 |
| 7 | 9.0 | isopropyl benzene | 18 | 18 |
| 8 | 9.7 | n-propyl benzene | 9 | 10 |
| 9 | 9.9 | Benzaldehyde + propyl benzene | 10 | 15 |
| 10 | 10.4 | alpha methyl styrene | 17 | 31 |
| 11 | 11.5 | 2-ethyl hexanol | 10 | 29 |
| 12 | 12.3 | acetophenone | 22 | 25 |
| 13 | 12.7 | cumyl alcohol | 43 | 81 |
| 14 | 19.0 | 1-dodecanol | 17 | 41 |
| 15 | 21.8 | dodecyl acrylate | 106 | 207 |
| 16 | 25.1 | oligomers-1 | 432 | 1306 |
| 17 | 28 | oligomers-2 | 268 | 880 |
| | | Total | 2211 | 3911 |

From the above results, it can be seen that the amount of gas collected by the method of Example 1 is about 1.8 times greater, and in particular, it is possible to minimize adsorption of high molecular weight substances detected behind retention time (Rt) to a structure such as a flow path.

Example 2

As shown in FIG. 8, an apparatus having a plurality of gas collectors (the first to third gas collectors) was used. A PI film as the sample 11 was disposed in the sample accommodating space 140. A Tenax tube, which is the adsorbent tube was used as the first gas collector, the second gas collector, and the third gas collector.

In the first temperature maintaining operation (S10), the temperature of the third heating space 203 was maintained at 50° C. for 5 minutes, and the analysis target gas generated for 5 minutes was collected in the first gas collector.

In the temperature raising operation (S20), the temperature of the third heating space 203 was heated to 180° C. at a temperature raising rate of 10° C./min, and the analysis target gas generated while the third heating space 203 was heated from 50° C. to 180° C. was collected in the second gas collector.

In the second temperature maintaining operation (S30), the temperature of the third heating space 203 was maintained at 180° C. for 2 hours, and the analysis target gas generated for 2 hours was collected in the third gas collector. The analysis results are shown in Table 2.

TABLE 2

| | Collection amount(ng/cm$^2$) | | |
| --- | --- | --- | --- |
| Gas component | First gas collector | Second gas collector | Third gas collector |
| acetonitrile | — | 109 | 321 |
| benzene | 2 | 4 | — |
| ethylene glycol | — | — | 226 |
| benzaldehyde | — | 50 | 214 |
| benzonitrile | — | — | 57 |
| cyclohexane, isocyanato- | — | 597 | 1607 |
| 5-nonanol | — | 14951 | 34294 |
| acetophenone | — | — | 90 |
| benzoic acid | — | 3041 | 16411 |
| diethylene glycol monomethacrylate | — | 138 | 2866 |
| 2-propenoic acid, 2-methyl-, 1,2-ethanediyl ester | — | — | 1770 |
| benzamide | — | — | 2466 |
| others & oligomer | — | 22099 | 28499 |
| Total | 2 | 40989 | 88821 |

Comparative Example 2

The outgas generated in a temperature environment of 180° C. for 2 hours was collected and analyzed using Jai Thermal Desorption (JTD, JTD505-III, JAI Company), and the analysis results are shown in Table 3.

TABLE 3

| Gas component | Collection amount(ng/cm$^2$) |
| --- | --- |
| acetonitrile | 215 |
| benzene | 10 |
| ethylene glycol | 58 |
| benzaldehyde | 104 |
| benzonitrile | 17 |

TABLE 3-continued

| Gas component | Collection amount(ng/cm$^2$) |
| --- | --- |
| cyclohexane, isocyanato- | 1734 |
| 5-nonanol | 49151 |
| acetophenone | 66 |
| benzoic acid | 23973 |
| diethylene glycol monomethacrylate | 2157 |
| 2-propenoic acid, 2-methyl-, 1,2-ethanediyl ester | 99 |
| benzamide | 1428 |
| others & oligomer | 59689 |
| Total | 138701 |

According to the results in Tables 2 and 3, information on amount of outgas generated according to temperature change is not known in Comparative Example 2, but according to the apparatus and method of Example 2, outgas generation information according to temperature change can be known. Therefore, it may be advantageous for material analysis used in various temperature environments.

Although the example embodiments according to the present disclosure have been described above, these are merely exemplary, and those skilled in the art will understand that various modifications and equivalent ranges of the example embodiments are possible therefrom. Accordingly, the scope for true technical protection of the present disclosure should be defined by the appended claims.

INDUSTRIAL APPLICABILITY

According to an apparatus for collecting high temperature gas of example embodiments of the present disclosure, it is possible to collect outgas generated in a high temperature environment up to 1000° C., and minimize adsorption of outgas containing polar volatile organic compound (VOC) in a flow path connected from a sample tube to a gas collector, thereby enhancing analysis efficiency and accuracy.

According to an apparatus and method for collecting high temperature gas of example embodiments of the present disclosure, it is possible to provide temperature conditions such as heating temperature, temperature raising rate, and temperature raising time to a sample, and separate and collect outgas generated from the sample according to different temperature conditions.

According to an apparatus for collecting high temperature gas of example embodiments of the present disclosure, it is possible to collect high temperature outgas without limitation for samples of various specifications.

What is claimed is:

1. An apparatus for collecting high temperature gas, comprising:
a sample tube extending in a first direction, the sample tube being configured to accommodate a sample in a sample accommodating space inside the sample tube;
a first stopper coupled to a first end of the sample tube, the first stopper having an inlet extending therethrough, the inlet configured to receive an injection therethrough of a carrier gas into the sample accommodating space;
a second stopper coupled to a second end of the sample tube, the second stopper having an outlet extending therethrough, the outlet configured to receive a discharge therethrough of an analysis target gas generated in the sample accommodating space;

a heating furnace configured to heat the sample, the heating furnace accommodating the sample tube in a heating space therein with the first stopper and the second stopper disposed outside of the heating furnace, a carrier gas supplier connected to the inlet via a first flow conduit and configured to supply the carrier gas to the sample accommodating space;

a plurality of gas collectors each configured to receive and collect therein a respective portion of the analysis target gas generated in the sample accommodating space;

an opening and closing part connected to the second end of the sample tube via a second flow conduit and configured to receive the analysis target gas of the sample accommodating space through the second flow conduit, the opening and closing part being configured to selectively deliver each respective portion of the analysis target gas to a corresponding one of the plurality of gas collectors;

a carrier gas preheater provided in the first flow conduit and configured to preheat the carrier gas passing through the first flow conduit; and a mass flow controller provided upstream of the carrier gas preheater on the first flow conduit and configured to control a flow rate of the carrier gas injected into the sample tube.

2. The apparatus of claim 1, wherein the heating space comprises:
   a first heating space closest to the first stopper;
   a second heating space closest to the second stopper; and
   a third heating space located between the first heating space and the second heating space,
   wherein the third heating space is configured to accommodate the sample therein.

3. The apparatus of claim 2, wherein the third heating space includes a first heating part configured to heat the sample, and the second heating space includes a second heating part configured to maintain the analysis target gas at or above a predetermined temperature.

4. The apparatus of claim 3, wherein the second stopper has one or more heater insertion apertures extending therein, and a cartridge heater inserted in the one or more heater insertion grooves.

5. The apparatus of claim 4, wherein the one or more heater insertion apertures is a plurality of the heater insertion apertures.

6. The apparatus of claim 5, wherein the outlet is formed on one surface of the second stopper, and the plurality of the heater insertion apertures are distributed along the circumference of a virtual circle having the outlet as a central point, the plurality of the heater insertion apertures extending into the one surface of the second stopper.

7. The apparatus of claim 2, wherein the apparatus is configured to heat the third heating space to a first temperature higher than a second temperature of the second heating space, and the apparatus is configured to heat the second heating space to the second temperature that is higher than a third temperature of the second stopper.

8. The apparatus of claim 2, wherein the apparatus is configured to maintain the third heating space at the first temperature of 25° C. to 1000° C., the apparatus is configured to maintain the second heating space at the second temperature of 25° C. to 500° C., and the apparatus is configured to maintain the second stopper at the third temperature of 25° C. to 150° C.

9. The apparatus of claim 8, wherein a first length of the first heating space in the first direction and a second length of the second heating space in the first direction are each 15% to 100% of a third length of the third heating space in the first direction.

10. The apparatus of claim 1, wherein the sample tube is a quartz tube.

11. The apparatus of claim 1, wherein the second stopper has a plurality of steps are defined on an inner circumferential surface of the outlet of the second stopper, and an inner diameter of one of the plurality of steps located closest to an entrance side of the outlet is larger than inner diameters of remaining ones of the plurality of steps.

12. The apparatus of claim 1, further comprising:
   a temperature maintainer configured to heat the opening and closing part to maintain a temperature of the analysis target gas passing through the opening and closing part at or above a predetermined level.

13. The apparatus of claim 1, wherein the opening and closing part comprises:
   a first opening to which the second flow conduit is connected;
   a plurality of second openings to which corresponding ones of the plurality of gas collectors are connected; and
   a variable flow path selectively connected to the first opening and a selected one of the plurality of second openings.

14. A method of collecting high temperature gas using the apparatus of claim- 1, comprising:
   a first temperature maintaining step of maintaining the sample at a first temperature for a first predetermined time;
   a temperature raising step of heating the sample to a second temperature higher than the first temperature at a predetermined temperature raising rate; and
   a second temperature maintaining step of maintaining the sample at the second temperature for a second predetermined time,
   wherein the carrier gas is continuously injected into the sample tube by a carrier gas supplier during the first temperature maintaining step, the temperature raising step, and the second temperature maintaining step, and
   the analysis target gas is generated from the sample, and the analysis target gas that is generated during the first temperature maintaining step, the temperature raising step, and the second temperature maintaining step is collected in a plurality of gas collectors.

15. The method of claim 14, wherein the plurality of gas collectors comprise a first gas collector, a second gas collector, and a third gas collector,
   the analysis target gas generated during the first temperature maintaining step is collected in the first gas collector,
   the analysis target gas generated during the temperature raising step is collected in the second gas collector, and
   the analysis target gas generated during the second temperature maintaining step is collected in the third gas collector.

16. The method of claim 14, wherein, during the temperature raising step, the predetermined temperature raising rate is 0.1° C./min to 100° C./min.

* * * * *